INVENTOR.
HARRY NAJIMIAN Jr.
BY
Wheeler, Wheeler & Wheeler
ATTORNEYS.

3,192,376
ANCHOR AND BOW LIGHT
Harry Najimian, Jr., Lake Bluff, Ill., assignor to Outboard Marine Corporation, Waukegan, Ill., a corporation of Delaware
Filed Sept. 18, 1962, Ser. No. 224,291
10 Claims. (Cl. 240—7.5)

The invention relates generally to navigational lights for boats and ships. More specifically, the invention relates to anchor lights and to bow or white running lights for boats.

The invention provides an anchor light and a bow or running light which are combined in a single, compact, unitary assembly. The disclosed construction is simple and economical, is adapted for mounting in forwardly projecting relationship on a suitable support of limited area, reliably excludes moisture from the interior, permits ready replacement of the bulbs therein, and affords reliable service over an extended time interval.

Other objects and advantages of the invention will become known by reference to the following description and the accompanying drawings of one embodiment of the invention, in which.

Figure 1:
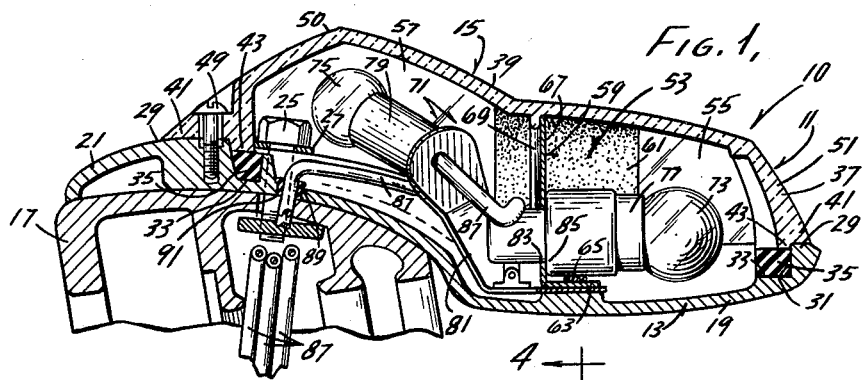
FIGURE 1 is a partially sectioned view, taken generally along line 1—1 of FIGURE 2, of a combined anchor and bow light embodying various of the features of the invention.
Figure 2:
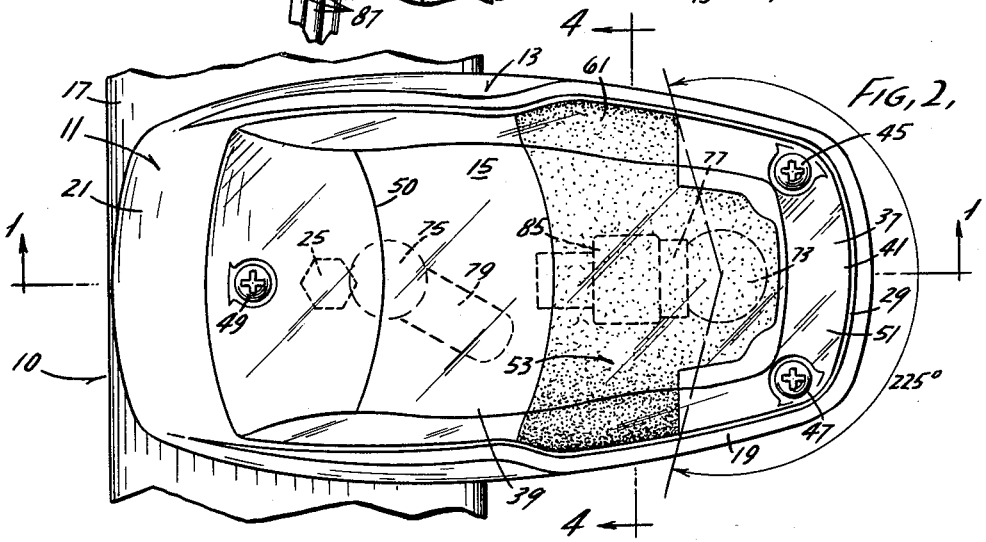
FIGURE 2 is a plan view of the combined light shown in FIGURE 1.
Figure 3:
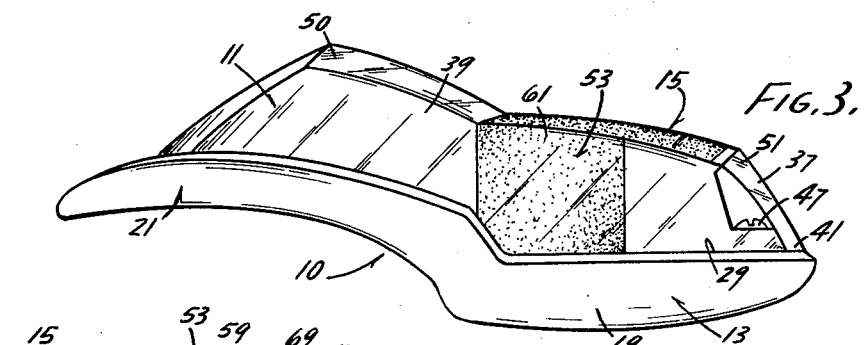
FIGURE 3 is a side elevational view of the combined light shown in FIGURES 1 and 2.
Figure 4:
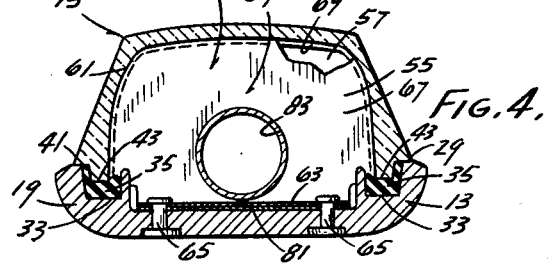
FIGURE 4 is a partially broken away, sectional view taken generally along line 4—4 of FIGURE 2.

The combined anchor and bow light 10 shown in the drawings includes a housing or casing 11 which comprises a base 13 and a lens 15 and which is adapted to be mounted on any suitable support, as for example, on a windshield frame 17 of a boat, as shown in FIGURES 1 and 2. As will be disclosed more fully hereinafter, the combined light 10 provides an anchor light which is viewable through a horizontal angle of 360 degrees and a forward running light which is viewable only through a horizontal included angle of 225 degress, i.e., through an angle of 112½ degrees measured on each side of the bow. As the anchor light must be seen from anywhere within a horizontal angle of 360 degrees, the anchor light is elevated with respect to the running light.

More specifically, the base 13 is a unitary member which can be fabricated of metal or plastic and which can take various forms. In the illustrated construction, the base includes a forwardly located depressed portion 19 and a rearwardly located relatively elevated portion 21. Suitable attachment means can be associated with the base 13 for securing the combined light to a support of limited area, such as the windshield frame 17. The illustrated construction includes an aperture in the rearward portion 21, through which a bolt 25 is passed to connect the light 10 to the windshield frame 17 and to locate the depressed forward base portion in forwardly projecting relation to the windshield frame 17. Sealing means in the form of a gasket 27 is employed to assure the exclusion of moisture into the housing 11 around the bolt 25. The illustrated base also includes a peripheral rim or ridge 29 including an internal shoulder 31 which is continuous with an internal channel 33 for seating a suitable sealing means or gasket 35 excluding the entry of moisture between the base 13 and the lens 15.

The lens 15 includes a complementary, relatively depressed forward portion 37 and a relatively elevated, rearward portion 39, together with a peripheral lip 41 for engagement with the base rim 29 and an inwardly adjacent continuous seat 43 engaging the gasket 35. The lens 15 can be secured to the base 13 in moisture-proof association by various means. The illustrated construction includes two forwardly located screws 45 and 47 and a single rearwardly located screw 49. Gaskets (not shown) can be employed around the head of the screws, as necessary, to exclude the entry of moisture.

The rearward portion 39 of the lens 15 is translucent and is formed to permit viewing thereof from any point within a horizontal angle of 360 degrees, including a generally dome shaped part 50. The lower or forward lens portion 37 extends, in the illustrated construction, from the forwardly located base margin of the dome shaped part 50 and includes a forwardly located translucent part or segment 51.

Extending from between the translucent segment 51 of the forward lens portion 37 and the dome shaped part 50 of the rearward lens portion 39 is opaque baffle means 53 defining, in part, a forwardly located chamber 55 which is also bounded by the translucent segment 51, and a rearwardly located chamber 57 which is also bounded by the translucent dome shaped part 50. The baffle means 53 also serves to limit the extent of the translucent segment 51 of the depressed forward lens portion 37 to an included horizontal angle of about 225 degrees, extending through equal arcs of about 112½ degrees, aft from the forwardmost point of the translucent segment, on each side of a fore and aft line from said forwardmost point. Although opaque baffle means of various constructions can be used, the illustrated construction includes a transverse, opaque baffle 59 and an opaque lens section 61 between the translucent forward segment 51 and aft the dome shaped part 50.

More specifically, the opaque lens section 61 extends across the top of the lens 15 and down both sides thereof to the base 13. In addition, the opaque section 61 extends forwardly along the top of the forward lens portion 37.

The baffle 59 can be a piece of sheet metal or opaque fish paper. In the illustrated construction, the baffle is generally L-shaped including a portion 63 which is suitably secured to the base 13, as by rivets 65, and a vertically extending baffle portion 67 which, along its periphery, is engaged and retained in proper position by means on the inner surface of the lens, such as the illustrated rib 69.

In order to provide the desired illumination, electric lighting means 71 is provided in the form of light bulbs 73 and 75 respectively located in the chambers 55 and 57 and respectively seated in sockets 77 and 79. The sockets are both mounted on a unitary bracket 81 which extends into the rearward chamber 57 and is secured between the base portion 63 of the opaque baffle 59 and the base 13 by the rivets 65. The socket 77 located in the forward chamber 55 extends through a suitable aperture 83 in the baffle portion 67 and includes a shouldered portion 85 which lies generally flush against the baffle portion 67 to exclude the passage of light through the aperture 83.

The light sockets 77 and 79 are connected through suitable means in the form of wiring 87 passing from the housing 11 through an aperture 89 in the base 13 to a suitable source of electrical energy and to suitable switch means. A grommet 91 is preferably arranged around the wires 87 in the area of the aperture 89 to prevent entry of moisture into the housing 11. Various other arrangements can also be employed for mounting the light bulbs 73 and 75 in the combined anchor and bow light 10.

Various of the features of the invention are set forth in the following claims.

What is claimed is:

1. The combination of a boat having a windshield frame and a combined anchor and bow light comprising a base mounted on said windshield frame at the fore and aft center line of the boat, a lens mounted on said base including a relatively elevated, rearwardly disposed, translucent portion viewable horizontally from 360 degrees, and a forwardly projecting, relatively depressed translucent portion, and opaque means extending from between said lens portions to said base to define a forward chamber and a rearward chamber and to limit light transmission through said depressed portion to an included angle of about 112½ degrees measured on each side of the center line of the boat from the intersection of said line with the forwardmost part of said depressed portion.

2. A combination in accordance with claim 1 wherein said base includes a relatively elevated rearward portion mounted on said windshield frame, and a relatively depressed forward portion extending in forwardly ajacent relation to said windshield frame.

3. A combined anchor and bow light comprising a unitary base having a relatively elevated rearward portion, and a relatively depressed forward portion, means on said rearward portion for mounting said base on a support, whereby when said base is attached to a support of limited area, said forward base portion is disposed in forwardly adjacent relation to the support, a unitary lens mounted on said base including a relatively elevated translucent portion viewable horizontally from 360 degrees, and a relatively depressed translucent portion, a baffle secured to said base and extending from said base to between said lens portions to define a forward chamber and a rearward chamber, and means for limiting light transmission through said depressed portion to an included angle of about 112½ degrees measured on each side of a line bisecting said lens and from the intersection of said line with the forwardmost part of said depressed portion, rib means on the interior surface of said lens in engagement with said baffle to assist in locating said baffle, a unitary bracket secured to said base and extending into said rearward chamber, a pair of light sockets on said bracket, an aperture in said baffle through which one of said light sockets extends, and a light bulb in each socket.

4. A combined anchor and bow light comprising a base having a substantial extent in a horizontally extending plane and means for mounting said base on a support, a lens mounted on said base, said lens including a first translucent portion having a substantial height above said base exposed for light transmission from said combined anchor and bow light and a second translucent portion located laterally from said first translucent portion and including a part extending above the top of said first portion, said second portion part being exposed for light transmission from said combined anchor and bow light through a horizontal angle of 360 degrees, opaque means extending from between said lens portions to said base, whereby there is defined first and second chambers respectively formed, in part, by said first and second lens portions, and means adapted for the provision of illumination in each of said first and second chambers, said opaque means limiting light transmission from said first lens portion to a horizontal included angle including equal segments measured on each side of the intersection of a line extending through the center of said means adapted for the provision of illumination and the part of said first lens portion located remotely from said second lens portion.

5. A combined anchor and bow light in accordance with claim 4 wherein said opaque means includes an opaque baffle extending from said base to said lens, said lens includes means engaging said baffle to locate at least a portion of the outer periphery of said baffle, and electrical illumination means in each of said first and second chambers.

6. A combined anchor and bow light in accordance with claim 4 in which each of said equal segments extends through an arc of about 112½ degrees.

7. The combination of a boat having a support located on the fore and aft center line of said boat and a combined anchor and bow light comprising a base mounted on said support, said base having a substantial extent in a horizontally extending plane, a lens mounted on said base, said lens including a first forwardly located translucent portion having a substantial height above said base exposed for light transmission from said combined anchor and bow light, and a second rearwardly located translucent portion including a part extending above the top of said first portion, said second portion part being exposed for light transmission from said combined anchor and bow light through a horizontal angle of 360 degrees, opaque means extending from between said lens portions to said base, whereby there is defined first and second chambers respectively formed, in part, by said first and second lens portions, a light source in each of said first and second chambers, said light sources being located on the fore and aft center line of said boat, said opaque means limiting light transmission through said first lens portion to a horizontal angle including equal segments of about 112½ degrees measured on each side of the intersection of the fore and aft center line of the boat and the part of said first lens portion located remotely from said second lens portion.

8. A combined anchor and bow light comprising a unitary base having a substantial extent in a horizontally extending plane and means for mounting said base on a support, a lens mounted on said base, said lens including a relatively depressed forward portion having a translucent forward segment with a substantial height above said base exposed for light transmission from said combined anchor and bow light and an opaque segment extending rearwardly from said translucent section, and an elevated rearward translucent portion including a part extending above the top of said forward portion, said rearward portion part being exposed for light transmission from said combined anchor and bow light through a horizontal angle of 360 degrees, opaque means extending from said opaque segment to said base, whereby there is defined first and second chambers respectively formed, in part, by said forward and rearward lens portions, and means in each of said forward and rearward chambers adapted to provide illumination, said opaque means and said opaque segment limiting light transmission from said forward lens portion to horizontal included angles including about 112½ degrees measured on each side of the intersection of a line extending through the center of said illuminating means and the part of said forward lens portion located remotely from said rearward lens portion.

9. A combined anchor and bow light comprising a unitary base having means for mounting said base on a support, a unitary lens mounted on said base including a relatively elevated translucent portion exposed for light transmission from said combined anchor and bow light from all directions around the periphery of said combined anchor and bow light, and a relatively depressed translucent portion having a substantial height above said base exposed for light transmission from said combined anchor and bow light, a partition secured to said base and extending from said base to between said lens portions to define forward and rearward chambers respectively defined, in part, by said depressed and elevated lens portions, rib means on the inner surface of said lens in engagement with said partition to assist in locating said partition, a first light socket in said forward chamber, a second light socket in said rearward chamber, and opaque means including said partition for limiting light transmission from said depressed portion through arcs of 112½ degrees measured on each side of the intersection of a line extending through the center of said light sockets and the part of said depressed lens portion located remotely from said elevated lens portion.

10. A combined anchor and bow light comprising a unitary base having means for mounting said base on a support, a unitary lens mounted on said base including a relatively elevated translucent portion exposed for light transmission from said combined anchor and bow light from all directions around the periphery of said combined anchor and bow light, and a relatively depressed translucent portion having a substantial height above said base exposed for light transmission from said combined anchor and bow light, a partition secured to said base and extending from said base to between said lens portions to define forward and rearward chambers respectively defined, in part, by said depressed and elevated lens portions, said baffle having an aperture therein, rib means on the inner surface of said lens in engagement with said partition to assist in locating said partition, a bracket in said rearward chamber secured to said base, a first light socket mounted on said bracket and extending through said aperture into said forward chamber, a second light socket on said bracket in said rearward chamber, and opaque means including said partition for limiting light transmission from said depressed portion through horizontal arcs of 112½ degrees measured on each side of the intersection of a line extending through the center of said light sockets and the part of said depressed lens portion located remotely from said elevated lens portion.

References Cited by the Examiner
UNITED STATES PATENTS

| | | | |
|---|---|---|---|
| 1,582,676 | 4/26 | Godley. | |
| 2,343,598 | 3/44 | Wagner | 240—7.1 |
| 2,343,754 | 3/44 | Donley | 240—8.3 X |
| 2,566,404 | 9/51 | Daon | 240—7.1 X |
| 3,032,644 | 5/62 | McGrew | 240—7.1 |

NORTON ANSHER, *Primary Examiner.*